United States Patent
Chen et al.

(10) Patent No.: US 11,519,088 B2
(45) Date of Patent: Dec. 6, 2022

(54) TITANIUM SUB-OXIDE/RUTHENIUM OXIDE COMPOSITE ELECTRODE AND PREPARATION METHOD AND APPLICATION THEREOF

(71) Applicant: JIANGSU PROVINCIAL ACADEMY OF ENVIRONMENTAL SCIENCE, Nanjing (CN)

(72) Inventors: Yong Chen, Nanjing (CN); Weijing Liu, Nanjing (CN); Bensheng You, Nanjing (CN); Chunkai Huang, Nanjing (CN)

(73) Assignee: JIANGSU PROVINCIAL ACADEMY OF ENVIRONMENTAL SCIENCE, Nanjing (CN)

( * ) Notice: Subject to any disclaimer, the term of this patent is extended or adjusted under 35 U.S.C. 154(b) by 442 days.

(21) Appl. No.: 16/816,203

(22) Filed: Mar. 11, 2020

(65) Prior Publication Data
US 2020/0208282 A1 Jul. 2, 2020

(30) Foreign Application Priority Data
Jan. 8, 2020 (CN) .......................... 202010018145.X

(51) Int. Cl.
*C25D 5/50* (2006.01)
*C25D 11/26* (2006.01)
(Continued)

(52) U.S. Cl.
CPC .......... *C25B 11/093* (2021.01); *C02F 1/4672* (2013.01); *C25B 11/051* (2021.01);
(Continued)

(58) Field of Classification Search
CPC ............ C25D 5/50; C25D 11/26; C25D 11/34
(Continued)

(56) References Cited

FOREIGN PATENT DOCUMENTS

| CN | 101857288 A | * | 10/2010 | .............. C02F 1/461 |
| CN | 105070943 A | * | 11/2015 | .............. B82Y 30/00 |

OTHER PUBLICATIONS

Yoo et al., "RuO2-Doped Anodic TiO2 Nanotubes for Water Oxidation: Single-Step Anodization vs Potential Shock Method," Journal of The Electrochemical Society (Jan. 14, 2017), vol. 164, No. 2, pp. H104-H111. (Year: 2017).*

(Continued)

*Primary Examiner* — Edna Wong
(74) *Attorney, Agent, or Firm* — CBM Patent Consulting, LLC

(57) ABSTRACT

A titanium sub-oxide/ruthenium oxide composite electrode and a preparation method and application thereof. Titanium-based titanium sub-oxide nanotubes is taken as a bottom layer, and titanium sub-oxide doped ruthenium oxide is taken as a surface composite active layer. A titanium substrate is anodized in a fluorine-containing ionic electrolyte, taken out, subjected to heating and roasting, cooled and then subjected to cathodic electrochemical reduction in polarizing liquid, so that a titanium-based titanium sub-oxide nanotube electrode is obtained; and then the titanium-based titanium sub-oxide nanotube electrode is taken as a cathode to be electrodeposited in a ruthenium trichloride electrolyte doped with titanium sub-oxide powder, taken out and then subjected to heating and roasting, so that the titanium sub-oxide/ruthenium oxide composite electrode is obtained.

9 Claims, 2 Drawing Sheets

(51) Int. Cl.
  *C25D 11/34* (2006.01)
  *C25B 11/093* (2021.01)
  *C02F 1/467* (2006.01)
  *C25B 11/051* (2021.01)
  *C25B 11/061* (2021.01)
  *C25D 3/50* (2006.01)
  *C25D 5/38* (2006.01)
  *C02F 1/461* (2006.01)

(52) U.S. Cl.
  CPC .............. *C25B 11/061* (2021.01); *C25D 3/50* (2013.01); *C25D 5/38* (2013.01); *C25D 5/50* (2013.01); *C25D 11/26* (2013.01); *C02F 2001/46138* (2013.01)

(58) Field of Classification Search
  USPC ....................................................... 205/171
  See application file for complete search history.

(56) References Cited

OTHER PUBLICATIONS

Cai et al., "The Effect of Electrolyte Composition on the Fabrication of Self-Organized Titanium Oxide Nanotube Arrays by Anodic Oxidation," Journal of Materials Research (Jan. 2005), vol. 20, No. 1, pp. 230-236. (Year: 2005).*
Fedorov et al., "Tailoring Electrochemical Efficiency of Hydrogen Evolution by Fine Tuning of TiOx/RuOx Composite Cathode Architecture," International Journal of Hydrogen Energy (Apr. 23, 2019), vol. 44, No. 21, pp. 10593-10603. (Year: 2019).*

* cited by examiner

TITANIUM SUB-OXIDE/RUTHENIUM OXIDE COMPOSITE ELECTRODE AND PREPARATION METHOD AND APPLICATION THEREOF

This application claims priority to Chinese Patent Application Ser. No. CN202010018145.X filed on 8 Jan. 2020.

TECHNICAL FIELD

The present disclosure relates to a titanium sub-oxide/ruthenium oxide composite electrode and a preparation method and application thereof, and belongs to the field of electrocatalytic oxidation electrodes and electrocatalytic oxidation treatment of wastewater containing organic pollutants.

BACKGROUND ART

Electrocatalytic oxidation is called an "environment friendly" technology, which effectively treats wastewater containing organic pollutants at the normal temperature and pressure by utilizing electrons as a catalyst. With continuous industrialization of electrocatalytic oxidation, it is becoming possible to apply an electrocatalytic oxidation technology to large-scale field application. The most critical thing in electrocatalytic oxidation is selection of anode materials. Titanium dioxide is low in electrocatalytic oxidation activity, and is low in electrocatalytic oxidation efficiency when directly used for electrocatalytic oxidation anodes. Titanium sub-oxide and ruthenium dioxide have a good electrocatalytic oxidation property, and have good oxidation and degradation effects on treatment of organic wastewater.

Due to a unique structure, nanotubes have the high order and large surface area, which is beneficial for improvement of the electrocatalytic property of electrodes. The titanium sub-oxide is a non-stoichiometric TiOx (Ti4O7) different from the titanium dioxide or titanium monoxide, but is also oxidized as an anode material itself, resulting in a short service life. As for traditional ruthenium dioxide electrodes which are mostly prepared by a brush preparation method, surfaces of the electrodes are in a "cracked-mud" shape obviously, and have many cracks, easily leading to falling off of surface active coatings, and the electrodes are short in service life and relatively low in electrocatalytic oxidation capacity. Improving compositions and composite structure forms of the electrodes is beneficial to strengthening and improving electrocatalytic performance of the electrodes.

SUMMARY OF THE INVENTION

The present disclosure aims to provide a composite electrode, electrode performance is optimized by improving a composite structure and a preparation method thereof, and the service life and electrocatalytic oxidation capacity of the electrode are effectively improved.

In order to realize the above-mentioned purpose, a technical solution adopted by the present disclosure is as follows:

a titanium sub-oxide/ruthenium oxide ($Ti_4O_7/RuO_2$) composite electrode takes titanium-based titanium sub-oxide nanotubes as a bottom layer, and titanium sub-oxide doped ruthenium oxide as a surface composite active layer.

A preparation method of the above-mentioned titanium sub-oxide/ruthenium oxide composite electrode includes the following steps:

(1) anodizing a titanium substrate in a fluorine-containing ionic electrolyte, taking out, heating and roasting the titanium substrate, performing cathodic electrochemical reduction in polarizing liquid after cooling to obtain a titanium-based titanium sub-oxide nanotube electrode; and (2) performing electrodeposition in a ruthenium trichloride electrolyte doped with titanium sub-oxide powder with the titanium-based titanium sub-oxide nanotube electrode obtained in the step (1) serving as a cathode, and taking out, heating and roasting the titanium-based titanium sub-oxide nanotube electrode to obtain the titanium sub-oxide/ruthenium oxide composite electrode.

Specifically, in the step (1), the fluorine-containing ionic electrolyte is a mixed solution of 0.05-0.25 mol/L potassium fluoride or sodium fluoride and 0.08-0.18 mol/L sulfuric acid or hydrochloric acid; and preferably, is a mixed solution of 0.15 mol/L potassium fluoride and 0.1 mol/L sulfuric acid.

In the step (1), anodizing time is 30-120 min, and a voltage is 20-40 V; and preferably, the anodizing time is 120 min, and the voltage is 20 V.

In the step (1), heating and roasting refer to that heating is conducted at a heating rate of 1-5° C./min from a room temperature to 400-550° C., and then heat-preservation roasting is conducted for 2-4 h; and preferably, the roasting temperature is 500° C., the heat-preservation roasting time is 3 h, and the heating rate is 2° C./min.

In the step (1), the polarizing liquid is a monopotassium phosphate and dipotassium phosphate containing buffer solution with pH being 6.5-7.5; preferably, a pH value is 7.0; cathodic electrochemical reduction time is 2-20 min, and an electric current density is 2-20 $mA/cm^2$; and preferably, the time is 10 min, and the electric current density is 10 $mA/cm^2$.

Specifically, in the step (2), in the electrolyte, a concentration of titanium sub-oxide is 0.1-2 g/L, a concentration of ruthenium trichloride is 2-20 mmol/L, and a concentration of hydrochloric acid is 1-10 mmol/L; and preferably, the concentration of the titanium sub-oxide is 1 g/L, the concentration of the ruthenium trichloride is 10 mmol/L, and the concentration of the hydrochloric acid is 5 mmol/L.

In the step (2), electrodeposition time is 20-120 min, and an electric current density is 5-25 $mA/cm^2$; and preferably, the electrodeposition time is 60 min, and the electric current density is 12 $mA/cm^2$.

In the step (2), heating and roasting refer to that heating is conducted at a heating rate of 1-5° C./min from a room temperature to 450-600° C., and then heat-preservation roasting is conducted for 3-6 h; and preferably, the roasting temperature is 550° C., the heat-preservation roasting time is 5 h, and the heating rate is 3° C./min.

The present disclosure further provides application of the above-mentioned titanium sub-oxide/ruthenium oxide composite electrode serving as an electrocatalytic oxidation anode to treatment of wastewater containing organic pollutants.

Beneficial Effects:

(1) The preparation method of the present disclosure has the characteristics of easy control, low equipment requirement, low cost and the like.

(2) The composite electrode is prepared through the method of the present disclosure, the titanium sub-oxide nanotubes are generated on a titanium base layer and directly connected with the titanium substrate, so that the surface area is increased, moreover, the composite surface structure of the electrode is improved, and the surface is dense and has no crack; and the titanium sub-oxide/ruthenium oxide composite active layer is evenly distributed, advantages of a titanium sub-oxide and ruthenium oxide composite structure are fully developed, the service life of the composite electrode is greatly prolonged, meanwhile, electrocatalytic activity is enhanced, and the characteristic of high electrocatalytic oxidation capacity is achieved.

BRIEF DESCRIPTION OF THE DRAWINGS

The present disclosure is further described in detail below in combination with accompanying drawings and specific implementations, and the advantages of the above-mentioned and/or other aspects of the present disclosure will become clearer.

DETAILED DESCRIPTION OF THE INVENTION

According to following embodiments, the present disclosure may be understood better.

Embodiment 1

Figure 1:
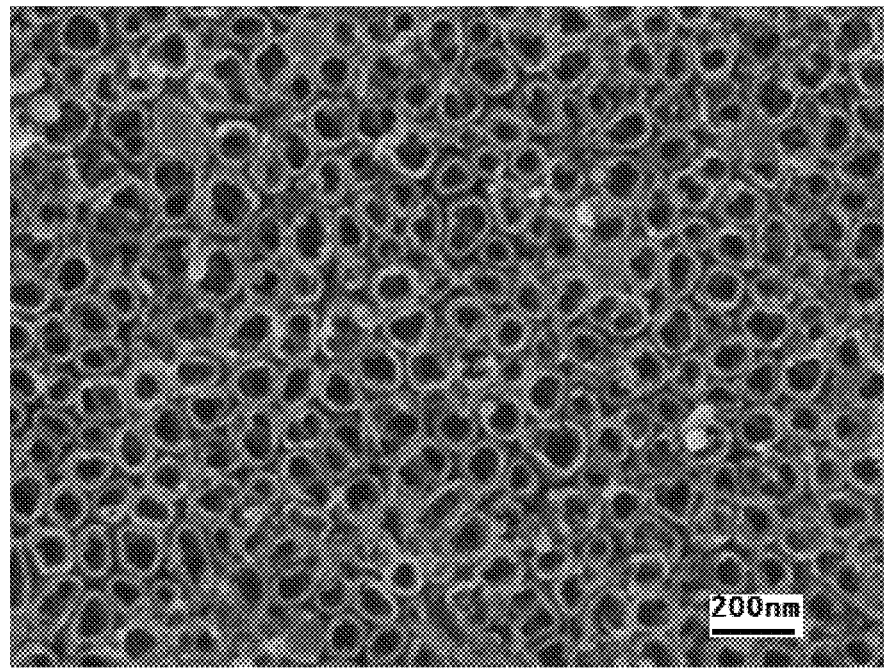
FIG. 1 is a scanning electron microscope (SEM) diagram of a surface of a titanium sub-oxide nanotube electrode of Embodiment 1.
Figure 2:
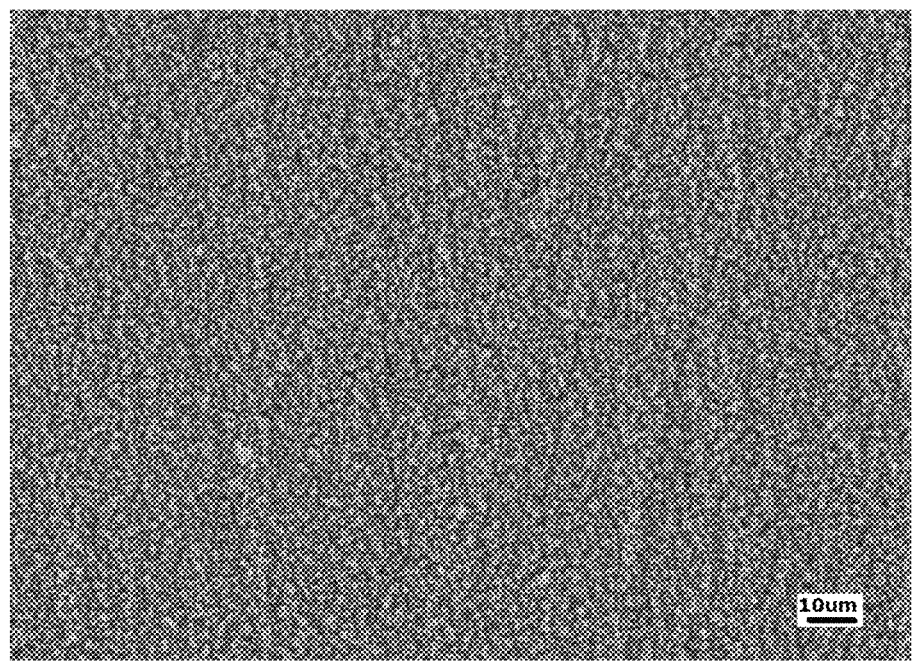
FIG. 2 is an SEM diagram of a surface of a titanium sub-oxide/ruthenium oxide composite electrode of Embodiment 1.
Figure 3:
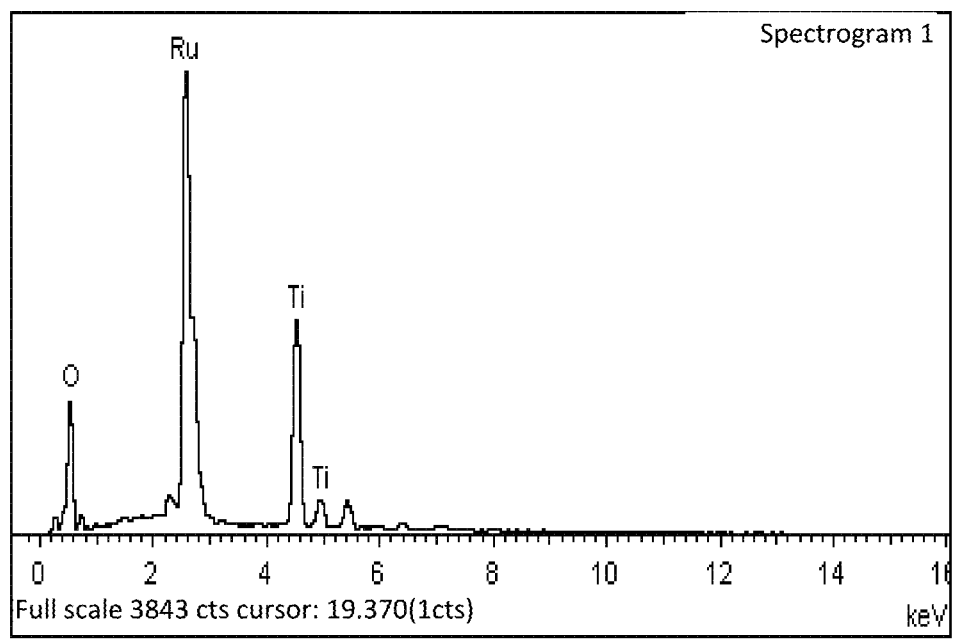
FIG. 3 is an energy dispersive spectrum (EDS) analysis diagram of the surface of the titanium sub-oxide/ruthenium oxide composite electrode of Embodiment 1.

A titanium sub-oxide/ruthenium oxide composite electrode is prepared specifically as follows: a titanium substrate is anodized in an electrolyte solution of 0.15 mol/L potassium fluoride and 0.1 mol/L sulfuric acid, where anodizing time is 120 min and a voltage is 20 V; the titanium substrate is taken out and then subjected to heating and roasting, where a roasting temperature is set to be 500° C., roasting time is set to be 3 h, and a heating rate is set to be 2° C./min; after cooling is conducted to reach the room temperature, cathodic electrochemical reduction is conducted in a monopotassium phosphate and dipotassium phosphate containing buffer solution with pH being 7.0, where reduction time is controlled to be 10 min, and an electric current density is controlled to be 10 mA/cm$^2$, so that a titanium-based titanium sub-oxide nanotube electrode is obtained, an SEM diagram of a surface of the electrode is shown in FIG. 1, and it can be seen that nanotubes are regular in structure and uniform in distribution, a diameter of the nanotubes reaches 80-110 nm, and because the nanotubes are of a two-dimensional structure, a surface area of a titanium plate bottom layer structure is effectively increased; the prepared titanium-based titanium sub-oxide nanotube electrode is taken as a cathode, and electrodeposition is conducted in an electrolyte, in which a concentration of titanium sub-oxide is 1 g/L, a concentration of ruthenium trichloride is 10 mmol/L, and a concentration of hydrochloric acid is 5 mmol/L, where electrodeposition time is controlled to be 60 min, and an electric current density is controlled to be 12 mA/cm$^2$; and the titanium-based titanium sub-oxide nanotube electrode is taken out and then subjected to heating and roasting, where a roasting temperature is set to be 550° C., roasting time is set to be 5 h, and a heating rate is set to be 3° C./min, so that the titanium sub-oxide/ruthenium oxide composite electrode is prepared. An SEM diagram of the titanium sub-oxide/ruthenium oxide composite electrode is shown in FIG. 2, it can be obviously seen that an electrode surface is dense and has no crack, titanium sub-oxide/ruthenium oxide composite grains are fine and dense and are evenly distributed, advantages of a titanium sub-oxide and ruthenium oxide composite structure may be fully developed, and the service life and electrocatalytic oxidation capacity of the electrode are effectively improved. An EDS diagram of the electrode is shown in FIG. 3, and O, Ru and Ti elementary compositions of the electrode are detected Enhanced accelerated life testing of the electrode is conducted under the condition of an electric current density 1 A/cm$^2$, finding that the accelerated service life of the titanium sub-oxide/ruthenium oxide composite electrode reaches up to 63 h. When the titanium sub-oxide/ruthenium oxide composite electrode is configured to treat industrial park wastewater (organic pollutants, namely COD is 175 mg/L), with the electric current density being regulated to be 15 mA/cm$^2$, after the titanium sub-oxide/ruthenium oxide composite electrode is taken as an anode for conducting an electrocatalytic oxidation reaction for 1.5 h, the COD removal rate reaches 82%.

Embodiment 2

A titanium sub-oxide/ruthenium oxide composite electrode is prepared specifically as follows: a titanium substrate is anodized in an electrolyte solution of 0.05 mol/L sodium fluoride and 0.08 mol/L sulfuric acid, where anodizing time is 30 min and a voltage is 40 V; the titanium substrate is taken out and then subjected to heating and roasting, where roasting temperature is set to be 400° C., roasting time is set to be 4 h, and a heating rate is set to be 1° C./min; after cooling is conducted to reach the room temperature, cathodic electrochemical reduction is conducted in a monopotassium phosphate and dipotassium phosphate containing buffer solution with pH being 6.5, where reduction time is controlled to be 2 min, and an electric current density is controlled to be 20 mA/cm$^2$, so that a titanium-based titanium sub-oxide nanotube electrode is obtained; the prepared titanium-based titanium sub-oxide nanotube electrode is taken as a cathode, and electrodeposition is conducted in an electrolyte, in which a concentration of titanium sub-oxide is 2 g/L, a concentration of ruthenium trichloride is 20 mmol/L, and a concentration of hydrochloric acid is 10 mmol/L, where electrodeposition time is controlled to be 20 min, and an electric current density is controlled to be 5 mA/cm$^2$; and the titanium-based titanium sub-oxide nanotube electrode is taken out and then subjected to heating and roasting, where a roasting temperature is set to be 450° C., roasting time is set to be 6 h, and a heating rate is set to be 1° C./min, so that the titanium sub-oxide/ruthenium oxide composite electrode is prepared Enhanced accelerated life testing of the electrode is conducted under the condition of an electric current density 1 A/cm$^2$, finding that the accelerated service life of the titanium sub-oxide/ruthenium oxide composite electrode reaches up to 60 h. When the titanium sub-oxide/ruthenium oxide composite electrode is configured to treat industrial park wastewater (COD is 175 mg/L), with the electric current density being regulated to be 15 mA/cm$^2$, after the titanium sub-oxide/ruthenium oxide composite electrode is taken as an anode for conducting an electrocatalytic oxidation reaction for 1.5 h, the COD removal rate reaches 83%.

Embodiment 3

A titanium sub-oxide/ruthenium oxide composite electrode is prepared specifically as follows: a titanium substrate is anodized in an electrolyte solution of 0.25 mol/L potassium fluoride and 0.18 mol/L sulfuric acid, where anodizing time is 60 min and a voltage is 25 V; the titanium substrate is taken out and then subjected to heating and roasting, where a roasting temperature is set to be 550° C., roasting time is set to be 2 h, and a heating rate is set to be 5° C./min; after cooling is conducted to reach the room temperature, cathodic electrochemical reduction is conducted in a monopotassium phosphate and dipotassium phosphate containing buffer solution with pH being 7.5, where reduction time is controlled to be 20 min, and an electric current density is controlled to be 2 mA/cm$^2$, so that a titanium-based titanium sub-oxide nanotube electrode is obtained; the prepared titanium-based titanium sub-oxide nanotube electrode is taken as a cathode, and electrodeposition is conducted in an electrolyte, in which a concentration of titanium sub-oxide is 0.1 g/L, a concentration of ruthenium trichloride is 2 mmol/L, and a concentration of hydrochloric acid is 1 mmol/L, where electrodeposition time is controlled to be 120 min, and an electric current density is controlled to be 20 mA/cm$^2$; and the titanium-based titanium sub-oxide nanotube electrode is taken out and then subjected to heating and roasting, where a roasting temperature is set to be 600° C., roasting time is set to be 3 h, and a heating rate is set to be 5° C./min, so that the titanium sub-oxide/ruthenium oxide composite electrode is prepared Enhanced accelerated life testing of the electrode is conducted under the condition of an electric current density 1 A/cm$^2$, finding that the accelerated service life of the titanium sub-oxide/ruthenium oxide composite electrode reaches up to 58 h. When the titanium sub-oxide/ruthenium oxide composite electrode is configured to treat industrial park wastewater (COD is 175 mg/L), with the electric current density being regulated to be 15 mA/cm$^2$, after the titanium sub-oxide/ruthenium oxide composite electrode is taken as an anode for conducting an electrocatalytic oxidation reaction for 1.5 h, the COD removal rate reaches 80%.

Comparative Embodiment 1

A titanium sub-oxide electrode is prepared specifically as follows: a titanium substrate is anodized in an electrolyte solution of 0.15 mol/L sodium fluoride and 0.1 mol/L sulfuric acid, where anodizing time is 90 min and a voltage is 22 V; the titanium substrate is taken out and then subjected to heating and roasting, where a roasting temperature is set to be 500° C., roasting time is set to be 3 h, and a heating rate is set to be 2° C./min; and after cooling is conducted to reach the room temperature, cathodic electrochemical reduction is conducted in a monopotassium phosphate and dipotassium phosphate containing buffer solution with pH being 7.0, where reduction time is controlled to be 10 min, and an electric current density is controlled to be 10 mA/cm$^2$, so that a titanium-based titanium sub-oxide nanotube electrode is obtained Enhanced accelerated life testing of the electrode is conducted under the condition of an electric current density 1 A/cm$^2$, finding that the accelerated service life of the titanium sub-oxide electrode is only 2 h. When the titanium sub-oxide electrode is configured to treat industrial park wastewater (organic pollutants, namely COD is 175 mg/L), with the electric current density being regulated to be 15 mA/cm$^2$, after the titanium sub-oxide electrode is taken as an anode for conducting an electrocatalytic oxidation reaction for 1.5 h, the COD removal rate is 67%.

Comparative Embodiment 2

A ruthenium oxide composite electrode is prepared specifically as follows: a titanium substrate is anodized in an electrolyte solution of 0.15 mol/L potassium fluoride and 0.1 mol/L sulfuric acid, where anodizing time is 90 min and a voltage is 25 V; the titanium substrate is taken out and then subjected to heating and roasting, wherein a roasting temperature is set to be 500° C., roasting time is set to be 3 h, and a heating rate is set to be 2° C./min, so that a titanium-based titanium dioxide nanotube electrode is obtained; the prepared titanium-based titanium dioxide nanotube electrode is taken as a cathode, and electrodeposition is conducted in an electrolyte, in which a concentration of ruthenium trichloride is 10 mmol/L, and a concentration of hydrochloric acid is 5 mmol/L, where electrodeposition time is controlled to be 60 min, and the electric current density is controlled to be 12 mA/cm$^2$; and the titanium-based titanium dioxide nanotube electrodeis taken out and subjected to heating and roasting, where a roasting temperature is set to be 550° C., roasting time is set to be 5 h, and a heating rate is set to be 3° C./min, so that the ruthenium oxide composite electrode is prepared Enhanced accelerated life testing of the electrode is conducted under the condition of an electric current density 1 A/cm$^2$, finding that the accelerated service life of the ruthenium oxide electrode is 32 h. When the ruthenium oxide composite electrode is configured to treat industrial park wastewater (organic pollutants, namely COD is 175 mg/L), with the electric current density being regulated to be 15 mA/cm$^2$, after the ruthenium oxide composite electrode is taken as an anode for conducting an electrocatalytic oxidation reaction for 1.5 h, the COD removal rate is only 55%.

The present disclosure provides a titanium sub-oxide/ruthenium oxide composite electrode and ideas and methods of a preparation method and application thereof, there are many methods and approaches to specifically realize the technical solution, the above is only the preferred implementations of the present disclosure, it should be noted that for those of ordinary skilled in the technical art, under the premise of not departing from principles of the present disclosure, several improvements and modifications may further be made, and the improvements and modifications also should be regarded as the protection scope of the present disclosure. All unspecified components in the embodiments may be implemented by using existing technologies.

What is claimed is:
1. A preparation method of a titanium sub-oxide/ruthenium oxide composite electrode, comprising the following steps:
   (1) anodizing a titanium substrate in a fluorine-containing ionic electrolyte to obtain an anodized titanium substrate, taking out, heating and roasting the anodized titanium substrate, cooling, and performing cathodic electrochemical reduction in a polarizing liquid to obtain a titanium-based titanium sub-oxide nanotube electrode; and
   (2) performing electrodeposition in a ruthenium trichloride electrolyte doped with titanium sub-oxide powder with the titanium-based titanium sub-oxide nanotube electrode obtained in the step (1) serving as a cathode to obtain an electrodeposited titanium-based titanium sub-oxide nanotube electrode, and taking out, heating and roasting the electrodeposited titanium-based titanium sub-oxide nanotube electrode to obtain the titanium sub-oxide/ruthenium oxide composite electrode.
2. The preparation method according to claim 1, wherein in the step (1), the fluorine-containing ionic electrolyte is a mixed solution of 0.05-0.25 mol/L potassium fluoride or sodium fluoride and 0.08-0.18 mol/L sulfuric acid or hydrochloric acid.

3. The preparation method according to claim 1, wherein in the step (1), anodizing time is 30-120 min, and a voltage is 20-40 V.

4. The preparation method according to claim 1, wherein in the step (1), heating and roasting refer to that heating is conducted at a heating rate of 1-5° C./min from a room temperature to 400-550° C., and then heat-preservation roasting is conducted for 2-4 h.

5. The preparation method according to claim 1, wherein in the step (1), the polarizing liquid is a monopotassium phosphate and dipotassium phosphate containing buffer solution with pH being 6.5-7.5; and cathodic electrochemical reduction time is 2-20 min, and an electric current density is 2-20 mA/cm$^2$.

6. The preparation method according to claim 1, wherein in the step (2), in the electrolyte, a concentration of titanium sub-oxide is 0.1-2 g/L, a concentration of ruthenium trichloride is 2-20 mmol/L, and a concentration of hydrochloric acid is 1-10 mmol/L.

7. The preparation method according to claim 1, wherein in the step (2), electrodeposition time is 20-120 min, and an electric current density is 5-25 mA/cm$^2$.

8. The preparation method according to claim 1, wherein in the step (2), heating and roasting refer to that heating is conducted at a heating rate of 1-5° C./min from a room temperature to 450-600° C., and then heat-preservation roasting is conducted for 3-6 h.

9. The preparation method according to claim 1, wherein the preparation method further comprises a step of applying the titanium sub-oxide/ruthenium oxide composite electrode on a wastewater containing organic pollutants.

* * * * *